April 29, 1930. R. R. W. VENZLAFF ET AL 1,756,770
ENDLESS TRACK VEHICLE
Filed Feb. 10, 1928

Patented Apr. 29, 1930

1,756,770

UNITED STATES PATENT OFFICE

RICHARD R. W. VENZLAFF AND OTTO F. BUCK, OF BERLIN, GERMANY

ENDLESS TRACK VEHICLE

Application filed February 10, 1928, Serial No. 253,456, and in Germany March 1, 1927.

This invention relates to motor vehicles of the class in which endless tracks or tractor belts carried by driving and idle pulleys are employed.

Vehicles of this type have heretofore been supported by suitably mounted riding or supporting wheels resting on tractor belts which are laterally flexible, and in such vehicles it is usual to laterally warp, bend or flex such tractor belts for steering and other purposes.

The primary objects of the present invention are to provide in such a vehicle a steering construction whereby the supporting wheels or rollers are displaced laterally and disposed angularly to the longitudinal axis of the vehicle, all by controlled means driven by the power plant of the vehicle; to provide very simple, quick and powerful means for operating said wheels as above; and to provide in such a construction tractor belt drive and idler wheels which are also laterally displaceable and to connect said drive and idler wheels and said supporting wheels in a single steering system driven by the vehicle motor.

Figure 1:
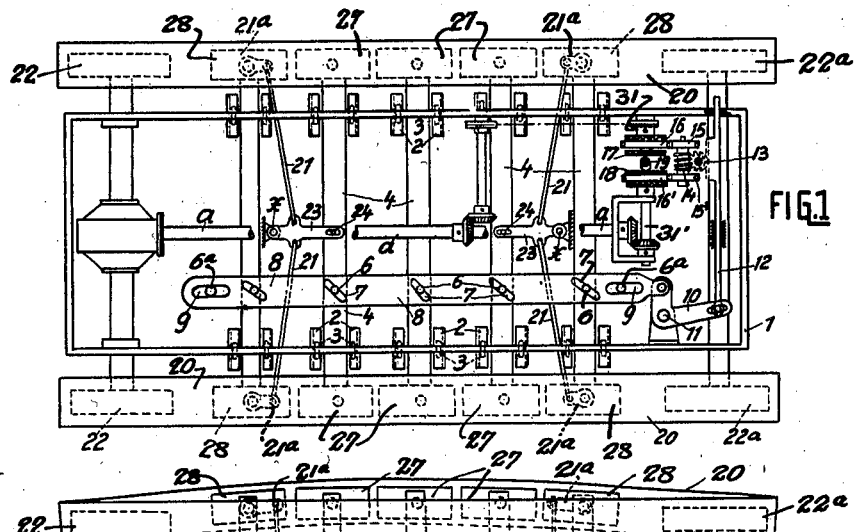
Figure 2:
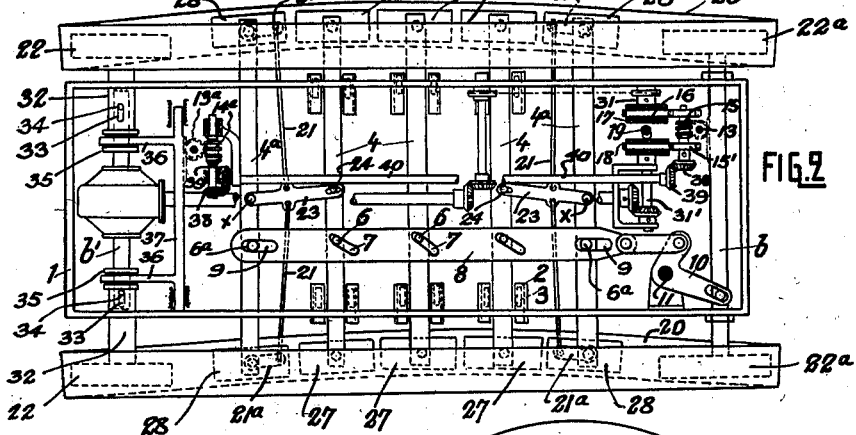

In the accompanying drawing:

Figure 1 represents a diagrammatic top plan view of a motor vehicle embodying my invention, the body thereof being omitted except for the indication of the outline of the frame 1;

Figure 2, a view similar to Fig. 1 of a modification; and

Figure 3:
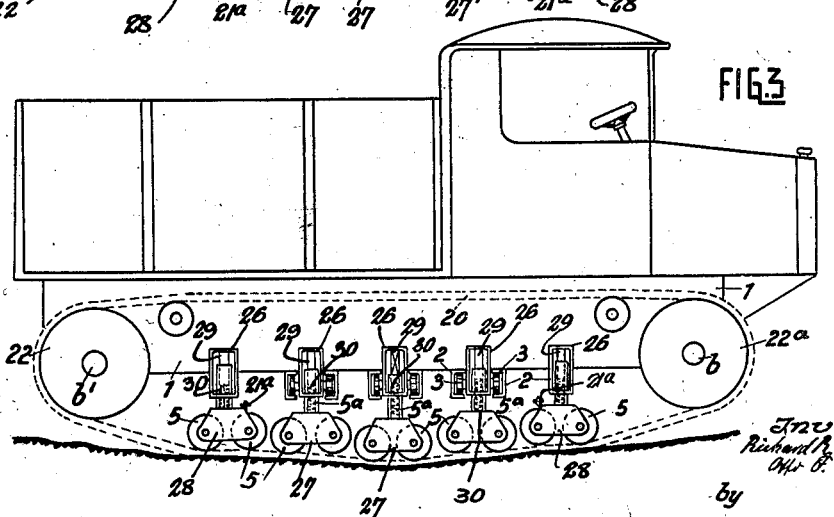

Figure 3, a side elevation of a vehicle of the modified form illustrated in Fig. 2.

Referring now in detail to the drawing, 1 designates the vehicle frame; 2, guides secured rigidly to the bottom of the frame and preferably of U-shape in cross-section as shown; 4, cross-bars extending across and beneath the frame 1 and having anti-friction rollers 3 working in said guides 2 respectively. Said guides 2 are arranged in pairs in opposed relation at spaced intervals adjacent each side of the bottom of frame 1, there being illustrated five such pairs of guides 2 adjacent each side of the lower face of frame 1, the corresponding pairs on the respective sides being in alignment transversely of the frame 1.

The cross-bars 4 are laterally displaceable, five being illustrated, and the rollers 3 are mounted in pairs near their ends respectively so as to work in the respective guides 2 of the corresponding cooperating pairs of guides.

On the respective end portions of the respective bars 4 are mounted supporting bearing frames 26 rotatably and slidably receiving the hollow positioning shafts or standards 5ª of the individual medial trucks 27 and end trucks 28 in which are mounted the supporting wheels 5, there being two such wheels or rollers 5 mounted for rotation in each such truck 27 and 28, all as shown in Fig. 3.

In both embodiments illustrated helical springs 30 are disposed in the standards 5ª and the respective supporting bearing frames 26 are provided with downwardly depending pintles 29 making a snug sliding fit in the respective cooperating standards 5ª, and said spindles 29 have lower faces disposed at right angles to their axes respectively, whereby each spring 30 is confined between the bottom of its standard 5ª and the opposed lower end face of its cooperating pintle 29, thus providing a very simple and efficient spring suspension for the vehicle, and the close fitting telescopic construction immediately above described also provides a very sturdy, simple pivotal mounting for the trucks 27 and 28, of which the trucks 27 are left free so as to turn freely to follow the curve dictated.

A stud 6 is provided on the top of each of the laterally displaceable bars 4 and heavier guide studs 6ª depend from a fixed part of the vehicle frame 1, said pins 6 and 6ª all having vertical axes intersected by a common straight line.

A drag link or slide 8, having its end portions formed with straight slots 9 extending longitudinally to respectively receive the guide studs 6ª, is mounted between the crossbars 4 and the bottom of frame 1 and is pivotally connected with one arm of a bell-crank lever 10 pivotally mounted at 11 to a rigid bracket rigidly mounted on frame 1, and the other arm of said bell-crank lever 10 is slidably pivotally connected with a rod 12 mounted in fixed guides of said frame 1 and formed with a rack engaged by a pinion 13 for reciprocation transversely of the frame 1, such transverse movement of the rod 12 causing corresponding longitudinal reciprocation of the drag link or slide 8.

Said drag link or slide 8 has a plurality of oblique slots 7 disposed at progressively increasing angles to the longitudinal from each end portion to the middle, each of the end slots 7, that is, of the end bars 4, being parallel to each other and at an angle to all other slots 7, the slots 7 of the two bars 4 adjacent to the respective end bars being parallel to each other and at an angle to all other slots 7, and the slot 7 of the middle bar 4 being at an angle to all other slots 7 of said bars 4 and at a greater angle to the longitudinal than all other of said slots 7. Said slots 7 respectively receive said pins 6 and engage the sides thereof with their walls as the link or slide 8 is moved endwise, whereby said laterally displaceable cross-bars 4 will be moved endwise with relation to said frame 1 and also to varying degrees with relation to each other in uniform relation so that their end portions on each side of the frame 1 will together define arcs.

The medial or central portions of said slots 7 are all in line with the common longitudinal central line of slots 9 and said slots 7 each extend equally on opposite sides of said central line, as shown in Fig. 1, this being the neutral position for driving in a straight line, hence reciprocatory movement of the slide 8 toward the rear will cause turning movement in one direction, whereas reverse reciprocatory movement of the slide 8 beyond said neutral point will cause turning movement in the reverse direction.

The pinion 13 is driven from the motor of the vehicle through suitable connections.

In the embodiments illustrated, such connections are by means of a worm 14 mounted in bearings on the frame 1 and having drive wheels 15 and 15' respectively in mesh with and driven by gear wheels 16 and 16' normally idle on shafts 31 and 31' respectively mounted in bearings of said frame 1 and having a common axis and respectively driven in opposite directions by any suitable connections driven from the power shaft $a$, all as illustrated in Figs. 1 and 2, clutches 17 and 18 respectively being movable by a suitable steering lever 19 to respectively grip at will the gear wheel 16 for rotation with its shaft 31, the wheel 16' idling on its shaft 31', or vice versa, said lever 19 being movable to neutral position, as indicated in Fig. 1, when no change in the direction of travel is desired.

In order to give the proper arcuate form to the warped tread portion of the traction belts 20 which extend about the respective pairs of drive and idler wheels 22 and 22ª respectively and are respectively driven by the respective drive wheels 22, we provide means for positively turning the front and rear trucks 28 about their vertical axes. To this end we provide, as illustrated in Fig. 1, levers 23 respectively pivotally mounted at $x$ on a fixed part of the frame, their respective inner ends being slidably pivotally connected to the respective cross-bars 4 which are next to the end cross-bars 4, as at 24, so that as said cross-bars move laterally the levers 23 will be forced to swing about their repective pivots $x$, and link-rods 21 connect the respective levers 23 with lugs 21ª on the corresponding pairs of end trucks 28, thus positively causing said trucks to turn in definite relation to each other in proportion to the swinging movement of the levers 23, which in turn is controlled by the lateral displacement of the cross-bars 4.

As thus far described, and as illustrated in Fig. 1, the rear or drive wheels 22 and the front or idle or driven wheels 22ª do not move laterally.

In the modification illustrated in Fig. 2, the construction and operation are in all respects the same as above described, except that said wheels 22 and 22ª do move laterally and the end cross-bars 4ª mounting end trucks 28 do not share in such lateral movement, and to this end the front axle $b$, which is not rotatably mounted serves the function of rod 12 of the preferred form, said axle $b$ being mounted for reciprocation in the frame 1, formed with a rack to be engaged by the pinion 13, and having the bell-crank lever 10 slidably pivotally connected to it, and to cause a corresponding lateral movement in the same direction of the rear drive wheels 22 they are mounted on sleeves 32 mounted in suitable bearings in the frame 1 and slidably receive the rear drive shaft or axle $b'$, said sleeves 32 being slotted at 33 and receiving therein cross-pins 34 mounted in said drive axle $b'$ to form a positive driving connection between said axle $b'$ and said sleeves 32. To provide for lateral shifting of said sleeves 32 they are each provided or formed with a grooved collar 35 to receive the respective shifting fingers 36 extending rearwardly from a rack-bar 37 mounted in suitable bearings of the frame 1 and engaged by a pinion 13ª mounted for rotation on frame 1 and engaged and driven by a worm 14ª mounted in suitable bearings on frame 1, and bevel gear wheels 38 respectively mounted on the ends of the shafts of said worms 14 and 14ª engage with cooperating bevel gear wheels 39 respectively mounted on the ends of a shaft 40 mounted in said frame 1, whereby the motion of worm 14 will be communicated to worm 14ª to cause the lateral displacement of the rear wheels 22 in the same direction, and to the same degree, as the lateral displacement of the front wheels 22ª caused by worm 14.

Also, in this modified form, Fig. 2, the levers 23 are pivotally connected to the stationary cross-bars 4ª at *x* instead of to the frame 1.

Having thus described our invention, what we claim as new and desire to secure by Letters Patent is:

1. A track-laying vehicle comprising a pair of flexible tracks upon which the vehicle travels, means for driving said tracks, a plurality of cross-beams, some of said cross-beams being laterally displaceable, trucks carried by the respective end portions of the respective cross-beams, supporting wheels carried by said trucks, and vertically disposed pins rigid with the laterally displaceable cross-bars, in combination with a slide guided between said frame and movable cross-bars and formed with slots disposed at an angle to the longitudinal central line of said slide and receiving said pins respectively, means for preventing lateral displacement of said slide, and means for at will moving said slide endwise in either direction.

2. A track-laying vehicle comprising a pair of flexible tracks upon which the vehicle travels, a plurality of cross-beams, some of said cross-beams being laterally displaceable, supporting wheels carried by the respective end portions of said cross-beams and respectively running on their respective cooperating tracks, and vertically disposed pins rigid with the laterally displaceable cross-bars, in combination with a slide guided between said frame and said laterally displaceable cross-bars and formed with slots disposed at an angle to the longitudinal central line of said slide and receiving said pins respectively, means for preventing lateral displacement of said slide, means for at will moving said slide endwise in either direction, and means for moving some of said wheels about vertical axes respectively to a degree in direct relation to the degree of lateral movement of some of said laterally displaceable cross-bars.

3. A track-laying vehicle comprising a pair of flexible tracks upon which the vehicle travels, means for driving said tracks, a plurality of cross-beams, some of said cross-beams being laterally displaceable, trucks carried by the respective end portions of the respective cross-beams, supporting wheels carried by said trucks and running on the respective cooperating tracks, and vertically disposed pins rigid with the laterally displaceable cross-bars, in combination with a slide guided between said frame and said movable cross-bars and formed with slots disposed at angles to the longitudinal central line of said slide and receiving said pins respectively, means for preventing lateral movement of said slide, means for at will moving said slide endwise in either direction, and connections between some of said cross-bars and some of said trucks for causing movement of such trucks about vertical axes respectively in definite relation to the degree of lateral displacement of some of said cross-bars.

4. A track-laying vehicle comprising a pair of flexible tracks upon which the vehicle travels, laterally displaceable means for driving said tracks, a plurality of cross-beams, some of said cross-beams being laterally displaceable, trucks carried by the respective end portions of the respective cross-bars, supporting wheels carried by said trucks, and vertically disposed pins rigid with the laterally displaceable cross-bars, in combination with a slide guided between said frame and said laterally displaceable cross-bars and formed with slots disposed at angles to the longitudinal central line of said slide and receiving said pins respectively, means for preventing lateral movement of said slide, means for at will moving said slide endwise in either direction, means for laterally displacing said driving means, and connections between the two last mentioned means for causing their simultaneous interrelated operation.

5. A track-laying vehicle comprising a source of power, a pair of flexible tracks upon which the vehicle travels, laterally displaceable means for driving said tracks, a plurality of cross-bars, some of said cross-bars being laterally displaceable, trucks carried by the respective end portions of the respective cross-bars, supporting wheels carried by said trucks and running upon the respective cooperating tracks, and vertically disposed pins rigid with the laterally displaceable cross-bars, in combination with a slide guided between said frame and said movable cross-bars and formed with slots disposed at angles to the longitudinal central line of said slide and receiving said pins respectively, and means adapted to be driven by said source of power and including said slide and pins for simultaneously laterally displacing said driving means and some of said trucks in predetermined relation to each other throughout their relative movements.

RICHARD VENZLAFF.
OTTO BUCK.